US012803603B2

(12) United States Patent
Mikhemar et al.

(10) Patent No.: US 12,803,603 B2
(45) Date of Patent: Nov. 17, 2026

(54) DIGITAL CANCELLATION OF CIM3 DISTORTION FOR DIGITAL TRANSMITTERS

(71) Applicant: Avago Technologies International Sales Pte. Limited, Singapore (SG)

(72) Inventors: Mohyee Mikhemar, Aliso Viejo, CA (US); Alvin Lai Lin, Andover, MA (US); Andrew J. Blanksby, Lake Oswego, OR (US); Sudharshan Srinivasan, Bangalore (IN); Arya Behzad, Los Altos, CA (US); Bevin George Perumana, Anaheim, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 619 days.

(21) Appl. No.: 18/132,911

(22) Filed: Apr. 10, 2023

(65) Prior Publication Data

US 2024/0340030 A1 Oct. 10, 2024

(51) Int. Cl.

*H04B 1/04* (2006.01)
*H04B 1/16* (2006.01)
*H04B 1/68* (2006.01)

(52) U.S. Cl.

CPC ......... *H04B 1/0475* (2013.01); *H04B 1/1676* (2013.01); *H04B 1/68* (2013.01)

(58) Field of Classification Search

CPC ...... H04B 1/0475; H04B 1/1676; H04B 1/68; H04B 2001/0425; H04B 1/04; H04L 27/367; H04L 25/03343; H04L 27/2614; H04L 27/364; H04L 27/2626;

(Continued)

(56) References Cited

U.S. PATENT DOCUMENTS

| | | | | |
|---|---|---|---|---|
| 11,901,925 B2 * | 2/2024 | Nguyen | ............... | H04B 1/0475 |
| 2004/0125888 A1 * | 7/2004 | Cho | ...................... | H04L 27/365 |
| 2011/0143697 A1 | 6/2011 | Verma et al. | | |

(Continued)

FOREIGN PATENT DOCUMENTS

| | | | | |
|---|---|---|---|---|
| CN | 101340738 B * | 5/2011 | ........... | H04B 1/0475 |
| GB | 2058501 A * | 4/1981 | ............. | H03F 1/347 |

OTHER PUBLICATIONS

Foreign Search Report on non-Foley case related to U.S. Appl. No. 18/132,911 DTD Aug. 27, 2024.

*Primary Examiner* — Lana N Le

(74) *Attorney, Agent, or Firm* — Foley & Lardner LLP

(57) ABSTRACT

An apparatus includes a first circuit to receive a first input data, a second input data and coefficients, generate a first distortion term and a second distortion term based, respectively on the first input data and the coefficients and the second input data and the coefficients, and change a polarity of the first distortion term and the second distortion term. A first subtraction circuit subtracts the first distortion term from the first input data and generates first difference data, and a second subtraction circuit subtracts the second distortion term from the second input data and generates second difference data. A transmit data-path generates a RF output. The first difference data and the second difference data compensate, based on the polarity changes of the first distortion term and the second distortion term, respectively, one or more impairments of the RF output.

19 Claims, 4 Drawing Sheets

(58) Field of Classification Search
CPC ... H04L 25/03821; H03F 1/3247; H03F 3/24; H03F 1/3241; H03F 1/32
See application file for complete search history.

(56) References Cited

U.S. PATENT DOCUMENTS

| | | | | |
|---|---|---|---|---|
| 2012/0064847 | A1 | 3/2012 | Xu et al. | |
| 2017/0180181 | A1* | 6/2017 | Chen | H04B 1/04 |
| 2020/0186103 | A1* | 6/2020 | Weber | H04L 27/368 |
| 2024/0333326 | A1* | 10/2024 | Zhao | H04B 1/1036 |

* cited by examiner

200A
$$V_{corr} = V_{data} - V_{CIM3} \quad \text{(Eq. 1)}$$
$$V_{corr} = Ic_{orr} + jQc_{orr} \quad \text{(Eq. 2)}$$
$$V_{data} = Id_{ata} + jQd_{ata} \quad \text{(Eq. 3)}$$
$$V_{CIM3} = I_{CIM3} + jQ_{CIM3} \quad \text{(Eq. 4)}$$
$$= \alpha e^{j\varphi}[I_{data}{}^{3} + j\ Q_{data}{}^{3}] - \beta e^{j\theta}[3I_{data} \cdot Q_{data}{}^{2} + j\ (3Q_{data} \cdot I_{data}{}^{2})]$$
FIG. 2A
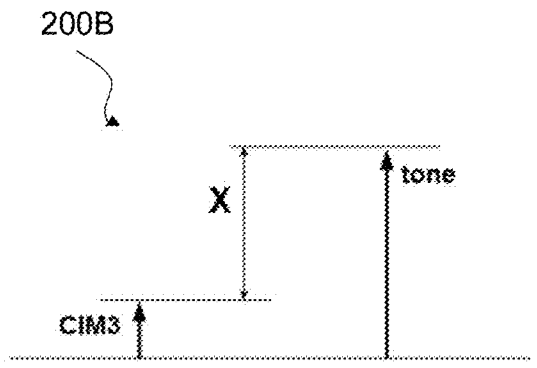
FIG. 2B
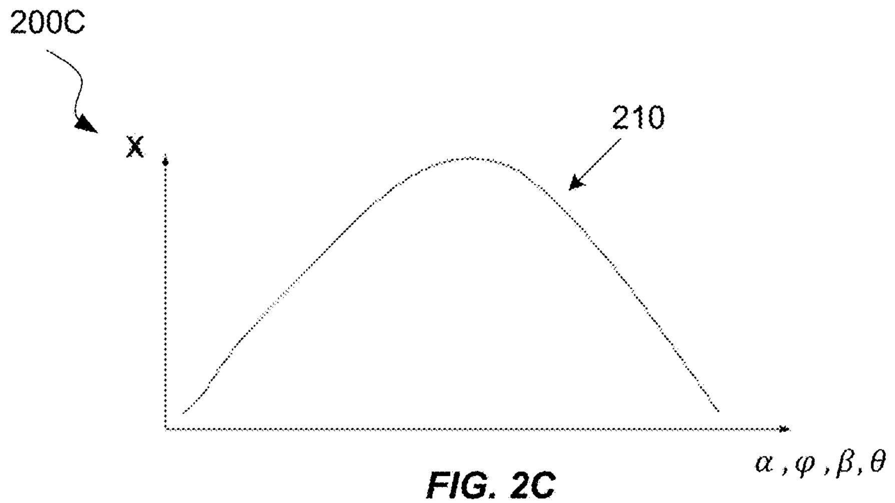
FIG. 2C

DIGITAL CANCELLATION OF CIM3 DISTORTION FOR DIGITAL TRANSMITTERS

TECHNICAL FIELD

The present description relates generally to data communications including, for example, a digital cancellation of third counter intermodulation (CIM3) distortion for digital transmitters.

BACKGROUND

Radio frequency (RF) digital transmitters and power amplifiers may include, among other blocks, digital-to-analog converter (DAC) circuits. In a conventional RF-DAC circuit, two separate DAC circuits are used for in-phase (I) and quadrature (Q) signals. The I-DAC circuit receives a digital I-input data and mixes the I-input data with a corresponding clock signal ($I_{clk}$) to generate an analog I-output signal. Similarly, the Q-DAC circuit, receives a digital Q-input data and mixes the digital Q-input data with a corresponding clock signal ($Q_{clk}$) to generate an analog Q-output signal, which is combined with the analog I-output signal to form the analog I/Q output signal for transmission.

In complex signal digital transmitters, individual cells combine switched currents, for example, by using a passive attenuator (PAD) circuit. The output current is a hard-switching, square-wave like waveform. This current, similar to any square wave, has strong odd-order harmonics including third order and fifth order harmonics. In the presence of a third order nonlinearity (e.g., in a PAD), the signal around three times the local oscillator (LO) frequency ($3\omega_{LO}$) mixes with the wanted signal ($\omega_{ss}$) and generates an in-band third counter intermodulation (CIM3) distortion at a frequency of $\omega_{LO}$-$3\omega_{ss}$, which needs to be canceled or at least reduced.

BRIEF DESCRIPTION OF THE DRAWINGS

Certain features of the subject technology are set forth in the appended claims. However, for purposes of explanation, several aspects of the subject technology are depicted in the following figures.

FIGS. 2A, 2B and 2C are charts illustrating an example calibration procedure for determining CIM3 cancellation coefficients, according to aspects of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block-diagram form in order to avoid obscuring the concepts of the subject technology.

According to some aspects, the subject technology is directed to a digital cancellation of CIM3 distortion for digital transmitters. The digital transmitter of the subject technology includes a first circuit (a distortion-generation circuit) configured to receive a first input data and a second input data and generate a first modified input data and a second modified input data. A first DAC circuit mixes the first modified input data with a first clock signal and generate a first output signal. A second DAC circuit mixes the second modified input data with a second clock signal and generate a second output signal. The first modified input data and the second modified input data are generated based on the first input data, the second input data and cancellation coefficients. In some embodiments, the cancellation coefficients are adjustable cancellation coefficients and are adjusted to reduce a power of a CIM3 component in the first output signal and the second output signals.

In some embodiments, the cancellation coefficients are determined experimentally through a calibration process, by generating a single-sideband tone and running it through the digital transmitter or the RF-DAC circuits. In some embodiments, a single-sideband tone is a signal generated by a SSB modulator, which removes a sideband of the signal in frequency domain. The cancellation coefficients are then swept while monitoring the power of the CIM3 component at the output of the digital transmitter or the RF-DAC until acceptable values are reached. The acceptable cancellation coefficients would result in a minimum determined value of the monitored power of the CIM3 component.

Figure 1A:
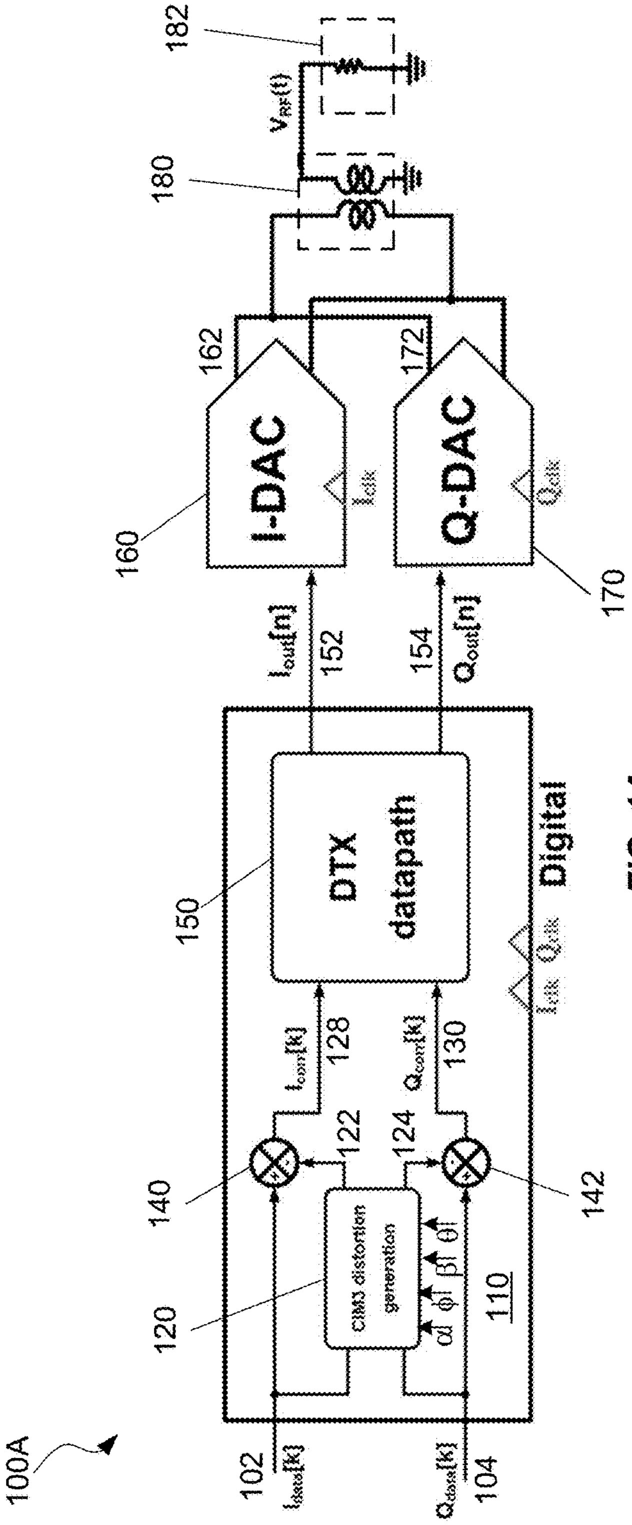
FIGS. 1A and 1B are a block diagram illustrating an example of a transmitter within which some aspects of the subject technology are implemented and a corresponding chart.
Figure 1B:
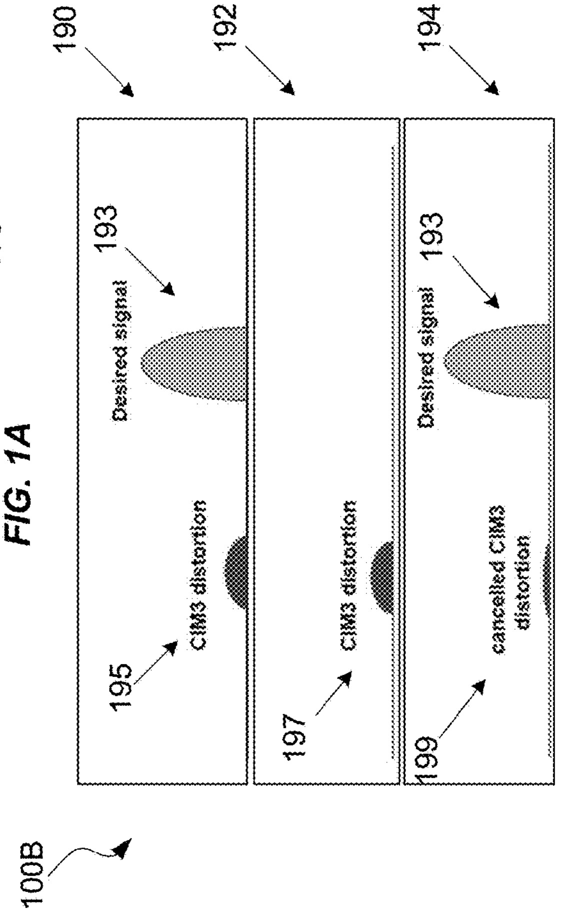

FIGS. 1A and 1B are a block diagram illustrating an example of a transmitter 100 within which some aspects of the subject technology are implemented and a corresponding chart. In some embodiments, the transmitter 100 is a digital transmitter. As shown, the transmitter 100 includes, but is not limited to, a cancellation circuit 110, a first digital-to-analog converter (DAC) circuit 160, a second DAC circuit 170, a combiner circuit 180 and a load 182. In some embodiments, the cancellation circuit is a processor that receives a first digital input data 102 and a second digital input data 104 and generate a first processed input data and a second processed input data. In some embodiments, the cancellation circuit 110 includes, but is not limited to, a CMI3 distortion-generation circuit 120, a digital transmit (DTX) data-path circuit 150 and subtraction circuits 140 and 142. The cancellation circuit 110 receives a first digital input data 102 ($I_{data}$ [k]) and a second digital input data 104 ($Q_{data}$ [k]) and generates a first modified input data 152 ($I_{out}$ [n]) and a second modified input data 154 ($Q_{out}$ [n]), respectively. The first digital input data 102 and the first modified input data 152 are in-phase (I) components, and the second digital input data 104 and the second modified input data 154 are quadrature (Q) components.

The first DAC circuit 160 (also referred to as a first RF circuit or the first mixer circuit) mixes the first modified input data 152 with a first clock signal ($I_{clk}$) to generate a first output signal 162. In some embodiments, the first DAC circuit 160 is an I-DAC circuit. The second DAC circuit 170 (also referred to as a second RF circuit or a second circuit) mixes the second modified input data 154 with a second clock signal ($Q_{clk}$) to generate a second output signal 172. In some embodiments, the second DAC circuit 170 is a Q-DAC circuit. The first output signal 162 and the second output signal 172 are combined by the combiner circuit 180 (e.g., a transformer) to generate an RF output signal, which is delivered to a load 182 (e.g., a resistor).

In some embodiments, the CMI3 distortion-generation circuit 120 generates a first distortion term 122 and a second distortion term 124 based on the first digital input data 102 and the second digital input data 104, respectively, as well as based on cancellation coefficients α, ϕ, β and θ. In some embodiments, the distortion terms include CMI3 distortions generated by the CMI3 distortion-generation circuit 120. In some embodiments, the cancellation coefficients α, ϕ, β and θ are adjustable cancellation coefficients. In some embodiments, the cancellation coefficients α, ϕ, β and θ are determined through a calibration process, discussed below. In some embodiments, the calibration process includes generating a single-sideband tone and running it through the transmitter 100 or the first DAC circuit 160 and the second DAC circuit 170. Using the cancellation coefficients α, ϕ, β and θ the CMI3 distortion-generation circuit 120 produces the first distortion term 122 and the second distortion term 124. In some embodiments, the first distortion term 122 and the second distortion term 124 are scaled to be equal in magnitudes and opposite in polarity to compensate the one or more impairments (e.g., the CIM component) and the scaled first distortion term and the scaled second distortion term are subtracted from the first digital input data 102 and the second digital input data 104, respectively, by a subtraction circuit 140 and a subtraction circuit 142. The subtraction circuits 140 and 142 produce correction data including a first difference data 128 ($I_{corr}$ [k]) and a second difference data 130 ($Q_{corr}$ [k]), respectively. In some embodiments, the first difference data 128 is the difference between the first digital input data 102 and the first distortion term 122. In some embodiments, the second difference data 130 is the difference between the second digital input data 104 and the second distortion term 124. The first difference data 128 ($I_{corr}$ [k]) and the second difference data 130 ($Q_{corr}$ [k]) have zero or reduced-power CIM3 components and are further processed by the DTX data-path circuit 150. In some embodiments, the DTX data-path circuit 150 is configured to up-sample, filter and condition the first difference data 128 and the second difference data 130 to subsequently provide the first modified input data 152 and the second modified input data 154 for delivering to the first DAC circuit 160 and the second DAC circuit 170. The up-sampling process is the process of increasing the sampling rate of a signal, which in the case of an image, enhances the resolution of the image. The sampling rate of the signal is increased by an up-sampling factor, which can be an integer or a rational fraction greater than unity. The filtering is a process that selectively reduces or removes unwanted features (e.g., frequency components) of the signal, for example the higher frequency images generated by the up-sampling. In some embodiments, the first difference data 128 and the second difference data 130 are unsampled and filtered to increase the sampling rate and remove unwanted frequency components. The conditioning of a signal is a signal processing operation that prepares the signal in term of, for example, amplitude, phase or frequency spectrum based on a condition of a next processing circuit.

The chart 100B shows plots 190, 192 and 194. The plot 190 depicts a desired (e.g., acceptable) signal 193 along with a CIM3 distortion 195 caused by the nonlinearity of the transmitter 100. The plot 192 depicts a CIM3 distortion 197 generated by CMI3 distortion-generation circuit 120, which is scaled to be equal in magnitude and opposite in polarity to cancel the CIM3 distortion 195. In some embodiments, a CIM3 distortion 197 is opposite in polarity with respect to the CIM3 distortion 195, which implies that positive (negative) magnitudes of the CIM3 distortion 197 are the same as the negative (positive) magnitudes of the CIM3 distortion 195. The plot 194 shows the desired signal 193 signal along with a cancelled CIM3 distortion 199, which a significantly reduced with respect to the CIM3 distortion 195. FIGS. 2A, 2B and 2C are charts 200A, 200B and 200C illustrating an example of a calibration procedure for determining CIM3 cancellation coefficient, according to aspects of the subject technology. The chart 200A show equations (Eq.) 1, 2, 3 and 4. In Eq. 1, the correction voltage term $V_{corr}$ is calculated by subtracting CIM3 voltage ($V_{CIM3}$) from the data voltage ($V_{data}$). In Eq. 2, $V_{corr}$ is defined as a complex value based on the first difference data 128 and the second difference data 130 of FIG. 1A, and in Eq. 3, $V_{data}$ is defined as a complex value based on the first digital input data 102 and the second digital input data 104 of FIG. 1A. Finally, in Eq. 4, the CIM3 correction voltage ($V_{CIM3}$) is expressed in terms of the cancellation coefficients α, ϕ, β and θ and the first and second digital input data. The CIM3 distortion is minimized at the output when the optimal values of the cancellation coefficients α, φ, β, and θ are used. The optimal values of the cancellation coefficients α, φ, β, and θ are found through a calibration procedure, as discussed below.

The calibration procedure is an experimental procedure in which a single-band tone is generated and applied to inputs of the transmitter 100 of FIG. 1A. During the experiment, the values of the cancellation coefficients α, φ, β, and θ are swept while monitoring the CIM3 component.

The chart 200B shows the amplitudes of the single-band tone and the CIM3 component with a variable X that represents the difference between the powers or amplitudes of the single-band tone and the CIM3 component.

The chart 200C shows a plot 210 of variation of the variable X versus values of any of the cancellation coefficients α, φ, β, and θ that are swept. The highest point in the plot 210 corresponds to a desired (e.g., acceptable) value of the respective parameter, as it corresponds to a respective lowest value (e.g., minimum determined value) of the CIM3 component. By repeating the experiment for different cancellation coefficients α, φ, β, and θ, respective desired (e.g., acceptable) values for all cancellation coefficients are obtained, which can be used in Eq. 4 of the chart 200A to determine the $V_{CIM3}$ that corresponds to the lowest value of the CIM3 component.

Figure 3:
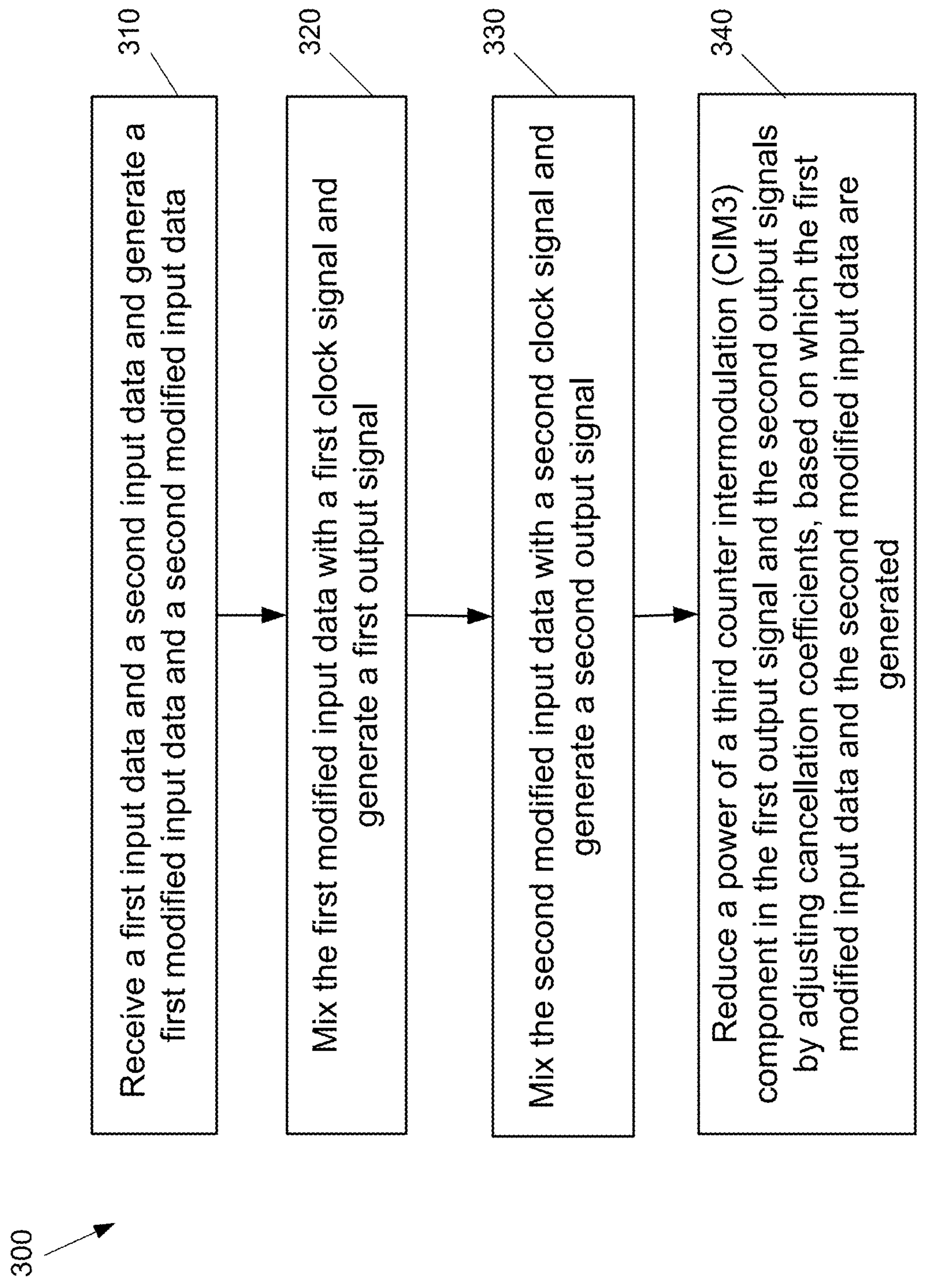
FIG. 3 is a flow diagram illustrating an example of a process for a CIM3 cancellation, according to aspects of the subject technology.

FIG. 3 is a flow diagram illustrating an example of a process 300 for a CIM3 cancellation, according to aspects of the subject technology. The process 300 includes receiving, by a cancellation circuit (e.g., cancellation circuit 110 of FIG. 1), a first input data (e.g., first digital input data 102 of FIG. 1) and a second input data (e.g., second digital input data 104 of FIG. 1) and generating a first modified input data (e.g., first modified input data 152 of FIG. 1) and a second modified input data (e.g., second modified input data 154 of FIG. 1) (310). The process 300 also includes mixing, by a first digital-to-analog converter (DAC) circuit (e.g., first DAC circuit 160 of FIG. 1), the first modified input data with a first clock signal (e.g., $I_{clk}$ of FIG. 1), to generate a first output signal (e.g., first output signal 162 of FIG. 1) (320). The process 300 further includes mixing, by a second DAC circuit (e.g., second DAC 170 of FIG. 1), the second modified input data with a second clock signal (e.g., $Q_{clk}$ of FIG. 1) and generate a second output signa (e.g., second output signal 172 of FIG. 1) (330). The process 300 further includes reducing a power of a CIM3 component in the first output signal and the second output signals by adjusting cancellation coefficients (e.g., α and ϕ of FIG. 1), based on which the first modified input data and the second modified input data are generated (340).

Figure 4:
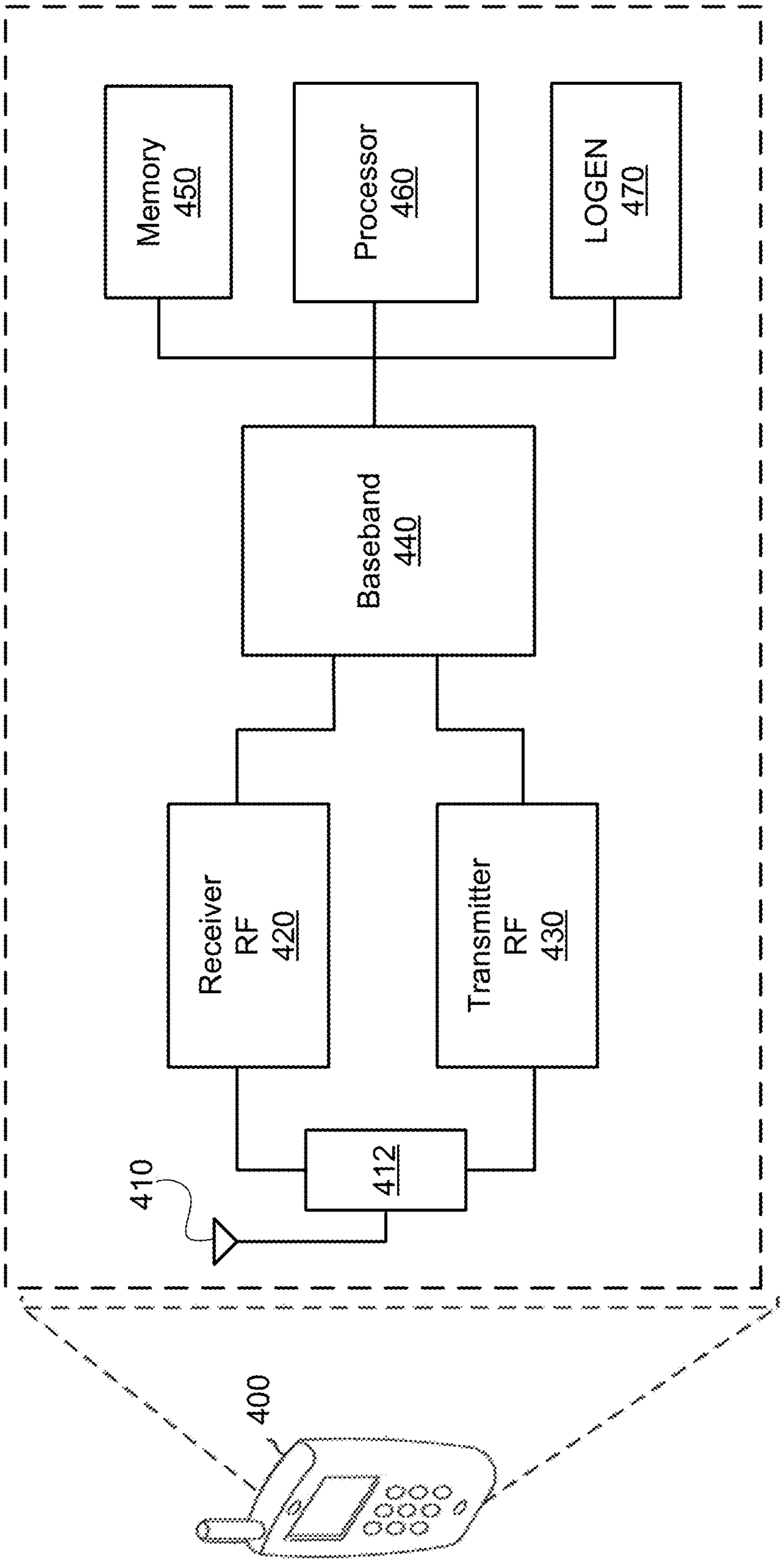
FIG. 4 illustrates an example of a wireless communication device within which some aspects of the subject technology are implemented

FIG. 4 illustrates an example of a wireless communication device 400 within which some aspects of the subject technology are implemented. In one or more implementations, the wireless communication device 400 can be a tablet, a smartphone, a smartwatch, or other electronic device that includes a pressure sensor. The wireless communication device 400 may comprise an RF antenna 410, a duplexer 412, a receiver 420, a transmitter 430, a baseband processing module 440, a memory 450, a processor 460, and a local oscillator generator (LOGEN) 470. In various aspects of the subject technology, one or more of the circuits represented in FIG. 4 may be integrated on one or more semiconductor substrates. For example, circuits 420-470 may be realized in a single chip, a single system on a chip, or in a multichip chipset.

The receiver 420 may comprise suitable logic circuitry and/or code that may be operable to receive and process signals from the RF antenna 410. The receiver 420 may, for example, be operable to amplify and/or down convert received wireless signals. In various aspects of the subject technology, the receiver 420 may be operable to cancel noise in received signals and may be linear over a wide range of frequencies. In this manner, the receiver 420 may be suitable for receiving signals in accordance with a variety of wireless standards such as Wi-Fi, WiMAX, BT, and various cellular standards. In various aspects of the subject technology, the receiver 420 may not use any sawtooth acoustic wave filters, and few or no off-chip discrete components such as large capacitors and inductors.

The transmitter 430 may comprise suitable logic circuitry and/or code that may be operable to process and transmit signals from the RF antenna 410. The transmitter 430 may, for example, be operable to upconvert baseband signals to RF signals and amplify RF signals. In various aspects of the subject technology, the transmitter 430 may be operable to upconvert and amplify baseband signals processed in accordance with a variety of wireless standards. Examples of such standards may include Wi-Fi, WiMAX, BT, and various cellular standards. In various aspects of the subject technology, the transmitter 430 may be operable to provide signals for further amplification by one or more power amplifiers. In some implementations, the transmitter 430 may be implemented as a digital transmitter and include the cancellation circuit 110 of FIG. 1 and implements the process of FIG. 4 to reduce a power of the CIM3 component.

The duplexer 412 may provide isolation in the transmit band to avoid saturation of the receiver 420 or damaging parts of the receiver 420, and to relax one or more design requirements of the receiver 420. Furthermore, the duplexer 412 may attenuate the noise in the receive band. The duplexer 412 may be operable in multiple frequency bands of various wireless standards.

The baseband processing module 440 may comprise suitable logic, circuitry, interfaces, and/or code that may be operable to perform the processing of baseband signals. The baseband processing module 440 may, for example, analyze received signals, and generate control, and/or feedback signals for configuring various components of the wireless communication device 400, such as the receiver 420. The baseband processing module 440 may be operable to encode, decode, transcode, modulate, demodulate, encrypt, decrypt, scramble, descramble, and/or otherwise process data in accordance with one or more wireless standards.

The processor 460 may comprise suitable logic, circuitry, and/or code that may enable processing data and/or controlling operations of the wireless communication device 400. In this regard, the processor 460 may be enabled to provide control signals to various other portions of the wireless communication device 400. The processor 460 may also control the transfer of data between various portions of the wireless communication device 400. Additionally, the processor 460 may enable implementation of an OS or otherwise execute code to manage operations of the wireless communication device 400. In one or more implementations, the processor 460 may be interfaced with any transducer modules via standard host interface technologies such as an inter-integrated circuit (I2C), a serial interface protocol (SPI), a peripheral component interconnect express (PCIE), a universal asynchronous receiver-transmitter (UART), and/or other interface technologies, depending on the data rate needed to sample and pipe from the transducers module to the processor 460.

The memory 450 may comprise suitable logic, circuitry, and/or code that may enable storage of various types of information such as received data, generated data, code, and/or configuration information. The memory 450 may comprise, for example, RAM, ROM, flash, and/or magnetic storage. In various aspects of the subject technology, information stored in the memory 450 may be utilized for configuring the receiver 420 and/or the baseband processing module 440.

The LOGEN 470 may comprise suitable logic, circuitry, interfaces, and/or code that may be operable to generate one or more oscillating signals of one or more frequencies. The LOGEN 470 may be operable to generate digital and/or analog signals. In this manner, the LOGEN 470 may be operable to generate one or more clock signals, and/or sinusoidal signals. Characteristics of the oscillating signals such as the frequency and duty cycle, may be determined based on one or more control signals from, for example, the processor 460 and/or the baseband processing module 440.

In operation, the processor 460 may configure the various components of the wireless communication device 400 based on a wireless standard according to which it is designed to receive signals. Wireless signals may be received via the RF antenna 410, amplified, and down converted by the receiver 420. The baseband processing module 440 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device 400, data to be stored to the memory 450, and/or information affecting, and/or enabling operation of the wireless communication device 400. The baseband processing module 440 may modulate, encode, and perform other processing on audio, video, and/or control signals to be transmitted by the transmitter 430 in accordance with various wireless standards.

In some embodiments, a digital transmitter of the subject technology includes a cancellation circuit to receive a first input data and a second input data and generate a first modified input data and a second modified input data. A first digital-to-analog converter (DAC) circuit mixes the first modified input data with a first clock signal and generate a first output signal. A second DAC circuit mixes the second modified input data with a second clock signal and generate a second output signal. The first modified input data and the second modified input data are generated based on the first input data, the second input data and cancellation coefficients that are adjustable to reduce a power of a third counter intermodulation (CIM3) component in the first output signal and the second output signals.

In some embodiments, the cancellation circuit includes a CIM3 distortion generation circuit to generate a first distortion term and a second distortion term based on the cancellation coefficients.

In some embodiments, the cancellation circuit further includes subtraction circuits to subtract the first distortion term and a second distortion term from the first input data and the second input data, respectively, and to generate a first difference data and a second difference data.

In some embodiments, the cancellation circuit further includes a digital second circuit configured to further process the first difference data and the second difference data.

In some embodiments, the digital second circuit further processes the first difference data and the second difference data by using the first clock signal and the second clock signal.

In some embodiments, the digital second circuit up-samples, filters and conditions the first difference data and the second difference data and provides the first modified input data and the second modified input data.

In some embodiments, the cancellation coefficient is produced by an experimental calibration process.

In some embodiments, the experimental calibration process is implemented by a calibration circuit configured to apply a single-sideband tone to input ports of the cancellation circuit and determine desired values of the cancellation coefficients.

In some embodiments, the calibration circuit monitors a power of the CIM3 component in the first output signal and the second output signal while values of the cancellation coefficients are adjusted. In some embodiments, the values of the cancellation coefficients are adjusted based on a value of the monitored power of the CIM3 component.

In some embodiments, the values of the cancellation coefficients are adjusted until the desired values of the cancellation coefficient is reached, wherein the desired values of the cancellation coefficient are values that result in a lowest value of the monitored power of the CIM3 component is achieved. The lowest value of the power of the CIM3 component is not a predefined or known value and is observed while experimentally monitoring the power of the CIM3 component.

In some embodiments, an integrated circuit of the subject technology includes a processor to process a first input data and a second input data and generate a first processed input data and a second processed input data. The integrated circuit also include a first circuit to mix the first processed input data with a first clock signal and generate a first output signal, and a second circuit to mix the second processed input data with a second clock signal and generate a second output signal. The processor includes a distortion generation circuit and a data-path circuit to process the first input data and the second input data using cancellation coefficients, and the cancellation coefficients are experimentally adjustable to reduce a power of a CIM3 component in the first output signal and the second output signals.

In some embodiments, a communication device of the subject technology includes a processor to process a first input data and a second input data and generate a first processed input data and a second processed input data. A first RF circuit receives the first processed input data and generate a first output signal, and a second RF circuit receives the second processed input data and generates a second output signal. The processor can process the first input data and the second input data using adjustable cancellation coefficients. Using the first processed input data and the second processed input data, respectively, by the first RF circuit and the second RF circuit alters a CIM3 component in the first output signal and the second output signals. The alteration may include causing a power reduction of the CIM3 component.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically stated, but rather "one or more." Unless specifically stated otherwise, the term "some" refers to one or more. Pronouns in the masculine (e.g., his) include the feminine and neuter gender (e.g., her and its), and vice versa. Headings and subheadings, if any, are used for convenience only, and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor is being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology, or that such aspect applies to all configurations of the subject technology. A disclosure relating to an aspect may apply to all configurations, or one or more configurations. A phrase such as an "aspect" may refer to one or more aspects, and vice versa. A phrase such as a "configuration" does not imply that such configuration is essential to the subject technology, or that such configuration applies to all configurations of the subject technology. A disclosure relating to a configuration may apply to all configurations, or one or more configurations. A phrase such as a "configuration" may refer to one or more configurations, and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known, or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise", as "comprise" is interpreted when employed as a transitional word in a claim.

Those of skill in the art would appreciate that the various illustrative s, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

What is claimed is:

1. An apparatus, comprising:

a first circuit configured to:

receive a first input data and a second input data, generate a first distortion term based on the first input data, generate a second distortion term based on the second input data, and change a polarity of the first distortion term and the second distortion term to generate a first polarity-inverted distortion term and a second polarity-inverted distortion term, a first subtraction circuit configured to subtract the first polarity-inverted distortion term from the first input data to generate first difference data;

a second subtraction circuit configured to subtract the second polarity-inverted distortion term from the second input data to generate second difference data; and a second circuit configured to generate a radio frequency (RF) output, wherein the first difference data and the second difference data are configured to compensate, based on the first polarity-inverted distortion term and the second polarity-inverted distortion term, one or more impairments of the RF output.

2. The apparatus of claim 1, wherein the first distortion term and the second distortion term are configured to be equal in magnitudes to compensate the one or more impairments of the RF output.

3. The apparatus of claim 1, wherein the second circuit comprises a digital transmit data-path configured to further process the first difference data and the second difference data by using a first clock signal and a second clock signal.

4. The apparatus of claim 3, wherein the second circuit is configured to: filter the first difference data and the second difference data, and subsequent to the filtering, provide a first modified input data and a second modified input data.

5. The apparatus of claim 1, the first distortion term and the second distortion term are generated further based on a plurality of coefficients, and wherein the plurality of coefficients comprise cancellation coefficients.

6. The apparatus of claim 5, further comprising a third circuit configured to:

apply a single-sideband tone to input ports of the first circuit, and determine values of the cancellation coefficients based on the single-sideband tone.

7. The apparatus of claim 6, wherein the impairments of the RF output comprise a third counter intermodulation (CIM3) component, and wherein the third circuit is configured to monitor a power of the CIM3 component in the RF output while the values of the cancellation coefficients are adjusted, and wherein the RF output includes a first output signal and a second output signal.

8. The apparatus of claim 7, wherein the cancellation coefficients are adjusted based on a value of the monitored power of the CIM3 component.

9. The apparatus of claim 8, wherein the value corresponds to a minimum determined value of the monitored power.

10. A system comprising:

a cancellation circuit configured to:

generate a first distortion term based on a first input data and a second distortion term based on a second input data;

change a polarity of the first distortion term and the second distortion term to generate a first polarity-inverted distortion term and a second polarity-inverted distortion term;

one or more subtraction circuits configured to subtract the first polarity-inverted distortion term from the first input data to generate a first difference data and subtract the second polarity-inverted distortion term from the second input data to generate a second difference data; and a transmitter configured to generate a radio frequency (RF) output using the first difference data and the second difference data to compensate for one or more impairments of the RF output.

11. The system of claim 10, wherein the first distortion term and the second distortion term are scaled to be corresponding in magnitude.

12. The system of claim 10, wherein the transmitter is further configured to process the first difference data and the second difference data using a first clock signal and a second clock signal respectively.

13. The system of claim 10, wherein the cancellation circuit is configured to generate the first distortion term and the second distortion term based at least in part on one or more cancellation coefficients.

14. The system of claim 13, wherein values of the one or more cancellation coefficients are determined based on a monitored power of a third counter intermodulation (CIM3) component in the radio frequency output.

15. The system of claim 14, further comprising a calibration circuit configured to apply a single-sideband tone to input data of the cancellation circuit.

16. A method for compensating impairments in a radio frequency (RF) output, comprising:

generating a first distortion term based on a first input data and a second distortion term based on a second input data;

changing a polarity of the first distortion term and the second distortion term to generate a first polarity-inverted distortion term and a second polarity-inverted distortion term;

subtracting the first polarity-inverted distortion term from the first input data to generate a first difference data and subtracting the second polarity-inverted distortion term from the second input data to generate a second difference data; and generating a radio frequency output using the first difference data and the second difference data to compensate for one or more impairments of the radio frequency output.

17. The method of claim 16, wherein generating the first distortion term and the second distortion term comprises using a plurality of cancellation coefficients.

18. The method of claim 16, further comprising applying a single-sideband tone to input ports used for the first input data and the second input data, and adjusting one or more parameters used to generate the distortion terms based on a monitored characteristic of the radio frequency output.

19. The method of claim 18, wherein the monitored characteristic comprises a power of a third counter inter-modulation (CIM3) component in the radio frequency output.

* * * * *